United States Patent
Dittrich et al.

[11] 3,829,924
[45] Aug. 20, 1974

[54] WINDSHIELD WIPER ARRANGEMENT

[75] Inventors: Günter Dittrich, Buhlertal; Erich Kolb, Eisental, both of Germany

[73] Assignee: Robert Bosch GmbH, Stuttgart, Germany

[22] Filed: June 23, 1972

[21] Appl. No.: 265,798

[30] Foreign Application Priority Data
June 24, 1971  Germany............................ 2131307

[52] U.S. Cl............................ 15/250.14, 15/250.27
[51] Int. Cl. .............................................. B60s 1/24
[58] Field of Search....... 15/250.14, 250.30, 250.13, 15/250.27; 74/66, 67, 78

[56] References Cited
UNITED STATES PATENTS
3,060,479  10/1962  Simpson et al. .................. 15/250.14
3,733,913   5/1973  Schneider et al. ............ 15/250.27 X FOREIGN PATENTS OR APPLICATIONS
1,351,554  12/1963  France............................. 15/250.14
1,078,856   8/1967  Great Britain................... 15/250.27

Primary Examiner—Peter Feldman
Attorney, Agent, or Firm—Michael S. Striker

[57] ABSTRACT

A pair of wipers are each mounted for pivotal movement between an inner and an outer direction-reversing end position. The wiping fields of the wipers overlap in the region of the inner end positions. A motor drives the wipers via cranks associated with the latter. One of the wipers has associated with it a crank which moves in a uniform circular path, and at least the other wiper has associated with it a crank which moves in a non-uniform path, linkage means connecting the two cranks with one another. With this arrangement the wipers are so driven that when one wiper is moving away from its inner towards its outer direction-reversing end position, the other wiper just enters the region of overlap of the wiping fields on its way towards its inner direction-reversing end position.

10 Claims, 8 Drawing Figures

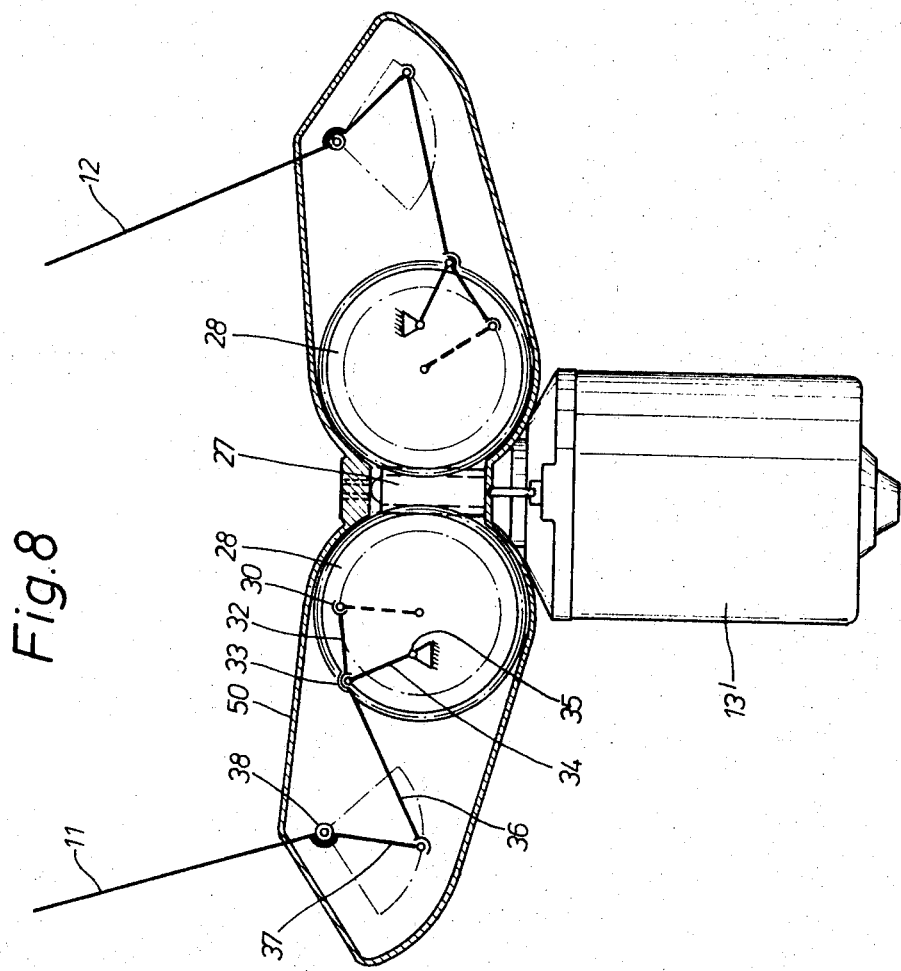

WINDSHIELD WIPER ARRANGEMENT

BACKGROUND OF THE INVENTION

The present invention relates generally to a windshield wiper arrangement, and more particularly to a windshield wiper arrangement for use especially in motor vehicles.

As s rule, motor vehicles by now are usually provided on their windshields not with one but with two windshield wipers. The wiping operation of these wipers may be of one of two basic types, namely wipers may move in unison and in identical directions, or they may move in mutually opposite directions. The present invention is concerned with a type in which the wipers move in unison between an outer direction-reversing end position and an inner direction-reversing end position but beginning in the outer end positions in which they fan away from one another, and with the wiper fields overlapping in the region of the inner direction-reversing end positions of the wipers.

With this type of wiper arrangement it is evidently necessary to assure that where the wipers overlap, that is where the wiping fields of the two wipers overlap, the wipers will not contact one another as they both move in the region of overlap. If not resulting in outright damage to the arrangement, such contact would at least prevent proper operation of the wipers. The prior art provides drive linkages for each of the wipers, with these linkages being differently configurated and the wipers being pivoted to and fro at different angular speeds. In one known arrangement, one wiper is driven by differential drive elements, and in another arrangement one wiper is driven by a sliding block whereas the other is driven by a four-bar chain. In all of these arrangements only relatively small differences between the motion characteristics of the two wipers can be achieved.

Other approaches to the solution of the problem at hand are characterized by driving the wipers with identical motion characteristics but driving them in such a manner that their movements are phase-displaced relative to one another in order to avoid contact in the region of overlap of the wiping fields. This means that the two wipers reach their respective end positions at different times, which has the disadvantage that unless special devices are provided for corrective purposes, at least one wiper will always be located within the wiping field (rather than returning to a position of parallelism at the bottom edge of the wiping field) when this drive is terminated.

Still another solution proposes a wiping arrangement with an asymmetrically arranged motor, where a connecting rod which connects the two wipers with one another is connected at one end with the crank of one wiper and with the other end with the coupling connected with the crank of the other wiper. The motion characteristic of the two wipers can be varied much more significantly with this type of arrangement than was possible in the other prior art constructions. However, this latter proposal is practical only in systems in which the drive motor is mounted asymmetrically and in which both wipers are connected with one another by a rod, because a relatively large amount of space is required for its installation. Because in many vehicles such space is not available, this arrangement is not practical in any but a relatively limited number of applications.

SUMMARY OF THE INVENTION

It is, accordingly, a general object of the present invention to overcome the disadvantages of the prior art.

More particularly it is an object of the present invention to provide such an arrangement as discussed herein, in which the motion characteristic of the wipers can be varied within wide ranges, even if the drive motor is mounted symmetrically between the two wipers of the system.

In pursuance of these objects and of others which will become apparent hereafter, one feature of the invention resides in a windshield wiper arrangement particularly for use in motor vehicles, which briefly stated, comprises a pair of wipers each mounted for pivotal movement between an inner and an outer direction-reversing end position, the wipers having wiping fields which overlap in the region of the inner end positions.

Drive means is provided for effecting the pivotal movement of the wipers, and includes a first crank connected with one of the wipers and operative for moving in a uniform circular path so as to impart the pivotal movement to the one wiper, and at least one second crank connected with the other of the wipers, and operative for moving in a non-uniform path, for imparting to the other wiper the pivotal movement thereof. Linkage means links the second crank with the first crank for transmitting motion from the latter to the former and in the arrangement just outlined the wipers are so driven that one of the wipers is moving from its inner to its outer direction-reversing end position at the time the other wiper enters the region of overlap of the wiping fields, and is moving from its own outer towards it inner direction-reversing end position.

It is also possible, in accordance with a further concept of the invention, that each of the wipers is provided with a crank which moves in a non-uniform path. In this case, the motion characteristics of both wipers can be varied, so that even if the overlap between the wiping fields is very substantial, a contact of the wipers can be avoided with certainty.

Arrangements constructed according to the present invention are compact, especially if each of the wipers is provided with its own gear unit and cranks and if the gear units and associated cranks for both wipers are combined with the motor to form an assembly.

A simple construction and a particularly easy assembling of the various components of the arrangement can be achieved if the motor shaft of the drive motor extends at opposite ends of the motor out of the motor housing, and if at each ends of the motor housing there is mounted — as by being flange-connected thereto — a stepdown gear unit with the two cranks. In such a construction is is advantageous if the two gear units with the associated cranks are arranged mirror-symmetrically with reference to a plane passing through the motor axis and in parallelism with the axis of the worm wheels of the respective gear units. In this manner it is possible to provide two identical gear unit casings, so that manufacturing costs can be reduced because only a single casing configuration need be manufactured.

The novel features which are considered as characteristic for the invention are set forth in particular in the appended claims. The invention itself however, both as to its construction and its method of operation, together with additional objects and advantages thereof, will be best understood from the following description of specific embodiments when read in connection with the accompanying drawings.

BRIEF DESCRIPTION OF THE DRAWING

FIG. 8 is a side view illustrating still another embodiment of the present invention.

DESCRIPTION OF THE PREFERRED EMBODIMENTS

Figure 1:
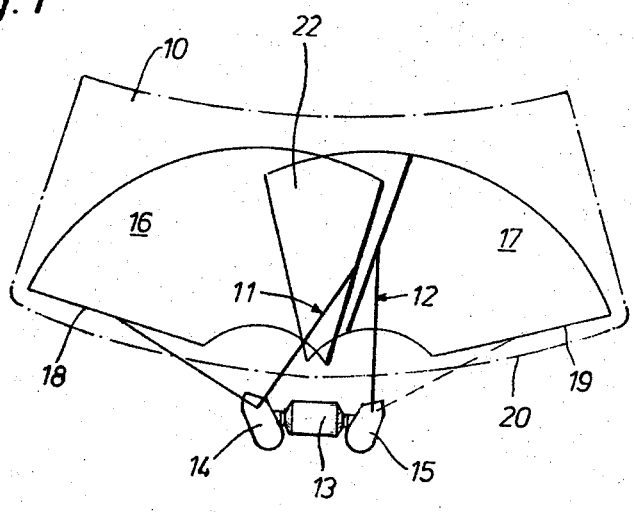
FIG. 1 is a diagrammatic illustration showing a wiper arrangement according to one embodiment of the invention, with the left-hand wiper being shown at its inner direction-reversing end position.

Discussing the drawing now in detail, the firstly FIGS. 1 – 5 thereof, it will be seen that in this embodiment a windshield has been identified with reference numeral 10. The arrangement of this embodiment utilizes two wipers 11 and 12 which are jointly driven by an electromotor 13 via respective gear units 14 and 15, so that they move to and fro in pivotal movement in accordance with what is already known from the art.

During such known pivotal movement, the wipers 11 and 12 — which move in mutually opposite directions — wipe over the wiping areas 16 and 17 which overlap at the center region of the windshield 10. The outer direction-reversing end positions of the wipers 11 and 12 are identified by the lines 18 and 19, respectively; when the wipers 11 and 12 reach these end positions their wiping blades extend at least approximately parallel with the lower edge 20 of the windshield 10, while when the wipers 11 and 12 reach the respective inner direction-reversing end positions, the wiping blades extend substantially vertical. Such an arrangement has the advantage that in each position the wiping blades extend substantially parallel to the lines of air flow which impinges upon the windshield when the associated vehicle moves in forward direction, whereby the danger that the wiper blades might be lifted off the windshield 10 at high speeds of movement of the vehicle, is largely avoided. It will be evident that the outer direction-reversing end position is also the parking position of the wipers 11 and 12, that is the position into which they move and which they remain when the drive is switched off.

It is necessary with this type of arrangement to assure that in the overlapping region 22 the wipers will not contact one another. To prevent this the wipers are driven with differential movement characteristics in such a manner that one wiper has already passed through its inner direction-reversing position at the time that the other wiper enters into the region of overlap 22.

This is clearly illustrated in the drawing and attention is directed to FIG. 1 where the wiper 11 is shown in its inner direction-reversing end position in which its wiper blade is located at the right-hand edge of the common overlap wiping region 22. While the wiper 11 is in this position the wiper blade of the wiper 12 is slightly spaced from the overlapping region 22, with such spacing being so selected that the wipers cannot contact one another under any circumstances. From the position illustrated in FIG. 1, the two wipers 11 and 12 move for a certain distance in parallelism with one another towards the left, until they have reached the position illustrated in FIG. 2, in which the right-hand wiper 12 has reached its inner direction-reversing position in which its wiper blade is located at the left-hand edge of the overlap region 22.

Figure 2:
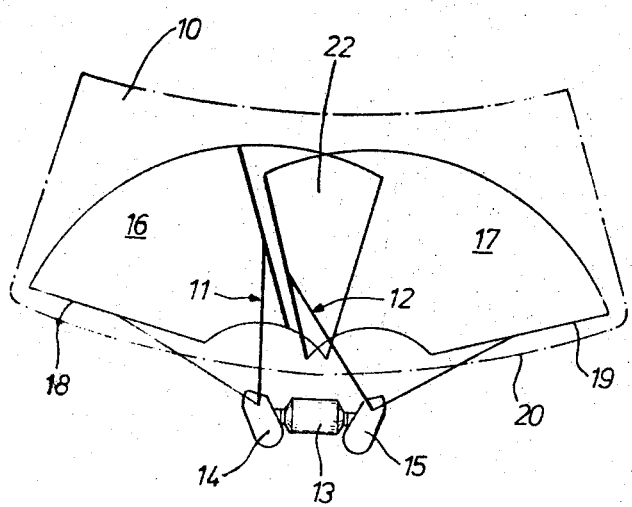
FIG. 2 is a view similar to FIG. 1, but showing the right-hand wiper in the inner direction-reversing end position.
Figure 3:
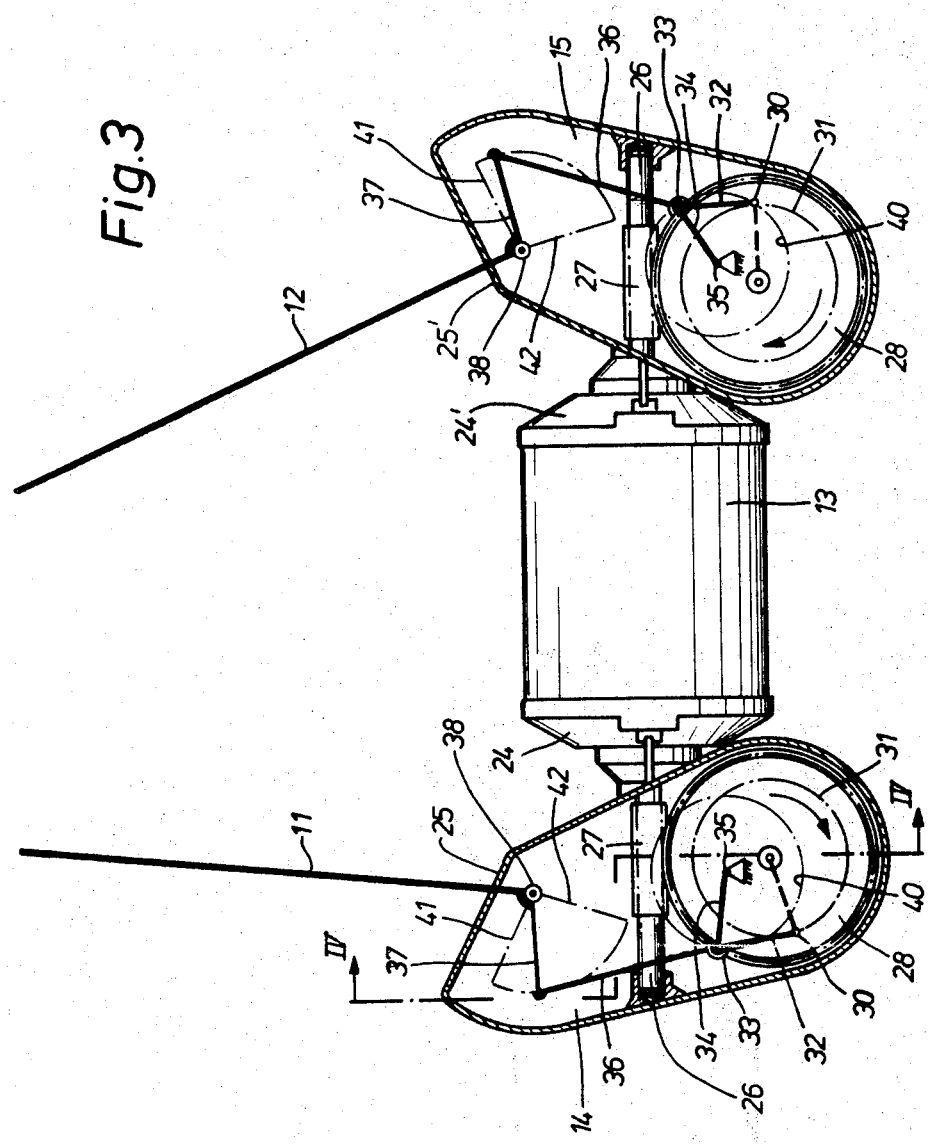
FIG. 3 is a partially diagrammatic fragmentary view illustrating the drive for the arrangement of FIGS. 1 and 2.
Figure 4:
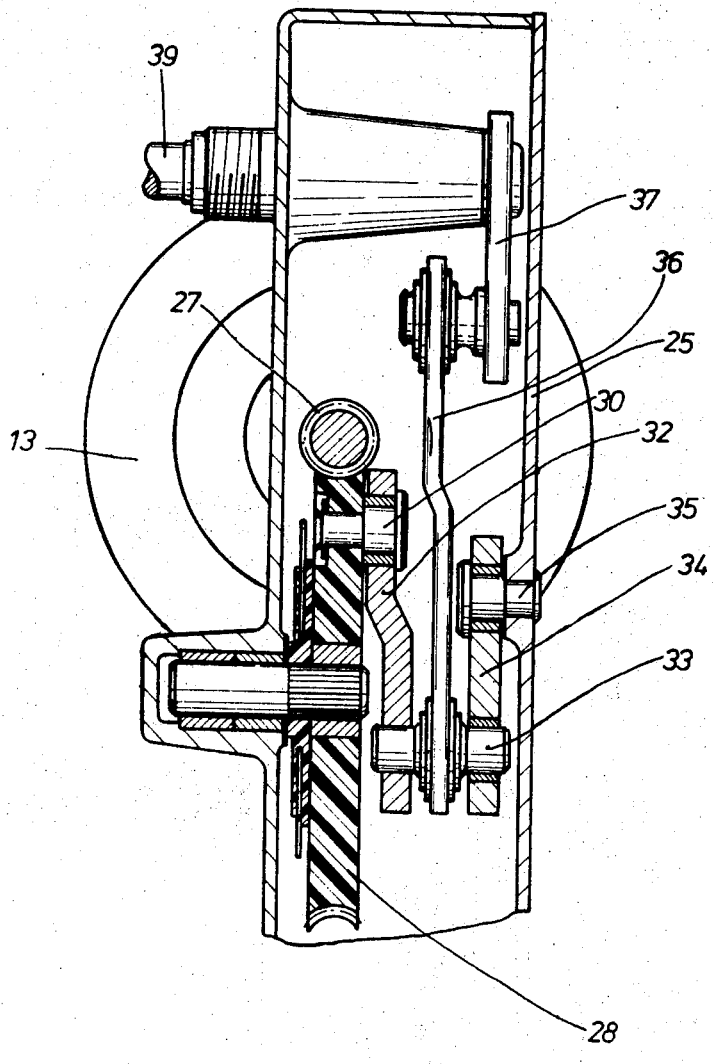
FIG. 4 is a section taken on line IV—IV of FIG. 3, but illustrating the arrangement in a different crank position than in FIG. 3.

From the position in FIG. 2, further movement of the wipers causes the two wipers to move apart from one another in mutually opposite directions until they reach their respective outer direction-reversing end positions 18 and 19, respectively. This takes place at the same time, meaning that one wiper returns to its outer direction-reversing end position faster than the other. The wipers 11 and 12 also leave their outer direction-reversing end positions 18 and 19 simultaneously, for movement back to the inner end positions, which requires that the left-hand wiper 11 move faster than the right-hand one, in order to reach the position illustrated in FIG. 1 at the same time as the right-hand wiper 12 reaches the position which is also shown in that Figure. Reference numeral 13 identifies a drive motor for the arrangement in FIGS. 1 – 5. It has a cover or plate 24 and 24' at opposite ends, which together with a gear housing 25, and 25' constitutes a casting. The drive shaft 26 of the motor 13 extends beyond the opposite ends thereof, and at each outer end portion of the drive shaft, the latter is provided with a worm 27 which engages in a worm wheel 28. At the end faces of each worm wheel 28 there is provided a crank pin 30 which moves in a circular path 31 when the motor 13 is energized. Crank pin 30 is connected via a coupling 32 with the crank pin 33 of a second crank 34, which is turnably journalled on a journal pin 35 provided on the housing 25. A connecting rod 36 connects the pin 33 with a crank or rocker arm 37 which is mounted on a shaft 38, the latter being turnably journalled in the housing 25. The shaft 38 extends with an end portion 39 out of the housing 25, as shown in FIG. 4. On this end portion 39, there is mounted the associated wiper 11 and 12 which has not been illustrated in FIG. 4 to simplify the illustration.

When the arrangement is to operate, the motor 13 is energized and turns the two worms 28, causing each of the pins 30 to travel in the circular path 31. The pin 30 drives via the coupling 32 the second crank, with the pin 33 moving in the circular path 40. Via the coupling 32, the circular movement of the pin 30 is converted into a non-circular, non-uniform movement of the crank 34, which is transmitted via the rod 36 through the crank or rocker arm 37. The latter therefore carries out a to and fro movement between the two end positions 41 and 42. The drive for the wiper 12 is arranged at least substantially mirror-symmetrically with reference to the wiper 11 so that in identical time periods both wipers move through different distances.

Figure 5:
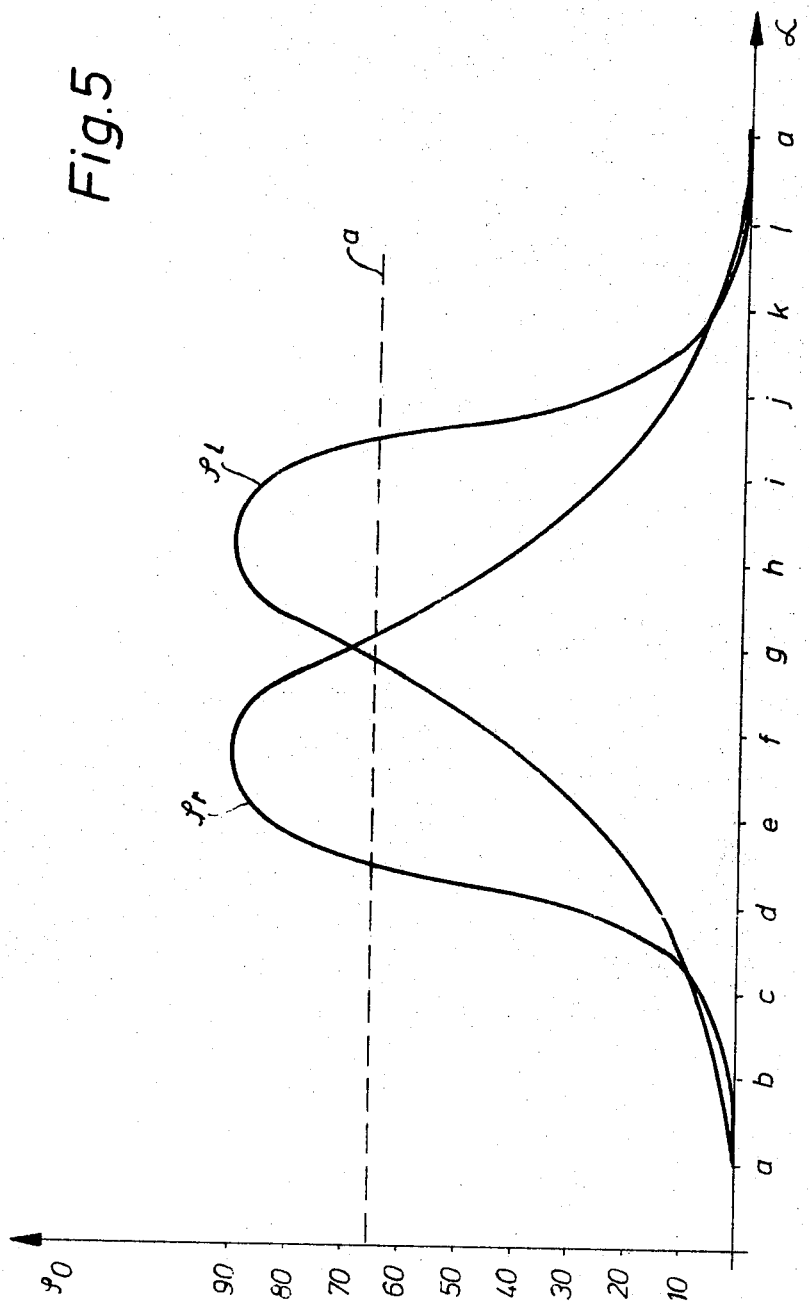
FIG. 5 is a diagram illustrating the motion cycle of the wipers in the embodiment of FIGS. 1 – 4.

The interposition of the second crank 34 assures that the wipers 11 and 12 have a motion characteristic which differs substantially from the motion characteristic obtainable with a conventional crank drive. This is illustrated in the diagram of FIG. 5, where the angular displacements $\phi_l$ and $\phi_r$ of the wipers 11 and 12 are superimposed upon the traversed angle $\alpha$ of the cranks 28, 30. The broken line $a$ designates the angular displacement (measured from the outer direction-reversing end position) which the wipers have traversed by the time they enter into the overlapping wiping area 22.

It will be seen from the diagram in FIG. 5 that the left wiper 11 enters into the overlapped wiping area 22 only when the right wiper 12 has passed through its inner-direction-reversing position, and vice versa. In this manner, it is reliably avoided that the wipers might contact in the area 22, and prevent one another from further movement. It is also evident from the diagram that both wipers will enter into and move out of their outer direction-reversing positions at the same time, so that the lack of symmetry in motions of the two wipers is no longer a disadvantage.

Figure 6:
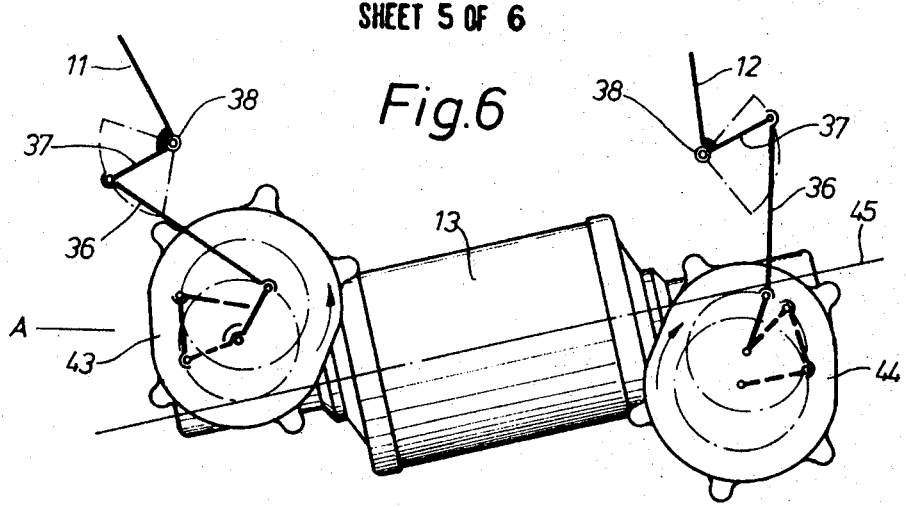
FIG. 6 is a view similar to FIG. 3 but illustrating another embodiment of the invention.
Figure 7:
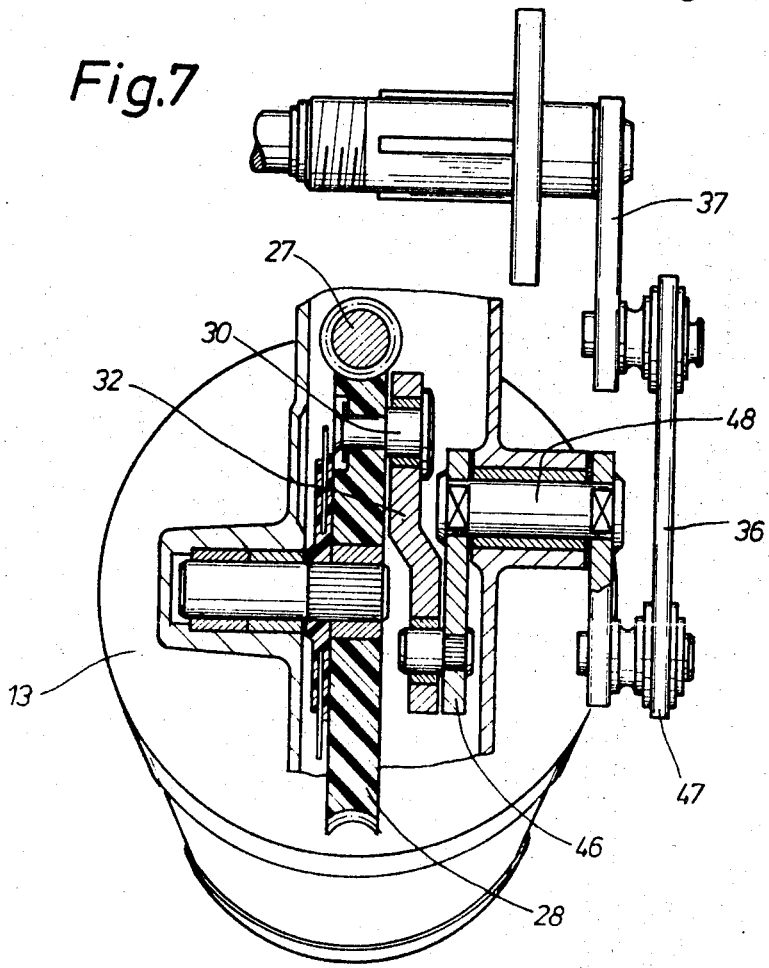
FIG. 7 illustrates a view as taken in the direction of the arrow A in FIG. 6, partially sectioned and in a different crank position than that shown in FIG. 6.

Coming to the embodiment illustrated in FIGS. 6 and 7, it will be seen that here the motor is again identified with reference numeral 13. In this embodiment it has two gear units 43 and 44, connected to its opposite ends and each of these gear units is composed as in the previous embodiment of a worm drive and a double crank. The gear units 43 and 44 are, however, arranged mirror-symmetrically with reference to a plane 45 which passes through the motor axis and extends in parallelism to the drive shafts for the wipers so that the housings of the units 43 and 44 can be of one and the same configuration, meaning that only a single housing configuration need be manufactured and tooling and manufacturing operations can be saved, therey reducing the production costs.

In the embodiment of FIGS. 6 and 7, the drive shafts 38 of the wipers 11 and 12 are also arranged separately from the housings 43 and 44, contrary to the previous embodiment. Here the rods 36 and the rocker arms 37 are located outside the housings 43 and 44, with the resultant advantage that the installation position of the motor with the gear units can be chosen more freely than in the preceding embodiment.

The second crank is here provided with two arms 46 and 47 which are mounted on a bolt 48 which is turnably journalled in the gear unit housing, and the arm 46 is located within the housing and connected with the coupling 32 whereas the other arm 47 is located outside the housing and connected with the rocker arm 37 via the rod 36. In other respect, the embodiment of FIGS. 6 and 7 is the same as in the preceding embodiment and the operation is also the same.

Coming to the embodiment in FIG. 8, it will be seen that the motor here is identified with reference numeral 13', being provided with a single worm 27 which drives both of the worm wheels 28, which are jointly located in a housing 50. In this arrangement, only a single gear unit housing is necessary, the housing 50, and the installation and assembly of this arrangement is therefore particularly simple. In other respects the embodiment of FIG. 8 corresponds to that of FIGS. 1 – 4, except that the two gear units 14 and 15 of that embodiment are here arranged in parallelism at one and the same end face of the motor 13'. The operation of the embodiment of FIG. 8 is also the same as in the preceding embodiments.

It will be understood that each of the elements described above, or two or more together, may also find a useful application in other types of constructions differing from the types described above.

While the invention has been illustrated and described as embodied in a windshield arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A windshield wiper arrangement, particularly for use in motor vehicles, comprising a pair of wipers each mounted for pivotal movement between an inner and an outer direction-reversing end position, said wipers having wiping fields which overlap in the region of said inner end positions; and drive means for effecting the pivotal movement of said wipers, said drive means comprising two drive sections each including a first crank operative for moving at constant speed in a first circular path, at least one second crank driven by said first crank for movement at non-constant speed in a second circular path and connected with one of said wipers to impart to the same said pivotal movement, and linkage means linking said second crank with said first crank for transmitting motion from the latter to the former, said wipers being driven at varying speeds so that as one of said wipers is moving from its inner to its outer direction-reversing end position the other wiper at the same time enters the region of overlap of said wiping fields and is moving towards its inner direction-reversing end position.

2. An arrangement as defined in claim 1, said cranks each having a center of rotation; and wherein the center of rotation of said second crank is located within the path described by said first crank.

3. An arrangement as defined in claim 1; and further comprising an additional second crank associated with a respective wiper.

4. An arrangement as defined in claim 1; further comprising a motor for driving said first cranks; and a step-down gearing between and associated with said motor and said first cranks.

5. An arrangement as defined in claim 1; further comprising a motor for driving said cranks; and a pair of step-down gear units each associated with said motor and with one of said cranks of each section, said motor constituting with said units and cranks a modular assembly.

6. An arrangement as defined in claim 5, said motor including a housing having opposite ends, and a drive shaft extending out of said housing at said opposite ends, each of said gear units and the respectively associated crank being connected to said housing at one of said opposite ends in driven engagement with said drive shaft.

7. An arrangement as defined in claim 6, said gear units and said associated cranks being arranged mirror-symmetrically relative to a plane passing through the axis of said motor.

8. An arrangement as defined in claim 5, said gear units including worm wheels; further comprising a single casing accommodating said worm wheels of both of said gear units, and also said cranks; and a worm gear driven by said motor and meshing with said worm wheels for driving the same.

9. An arrangement as defined in claim 5; further comprising journals journalling said wipers for said pivotal movement thereof.

10. An arrangement as defined in claim 9, wherein said journals constitute part of said modular assembly together with said motor, units and cranks.

* * * * *